Patented Oct. 10, 1933

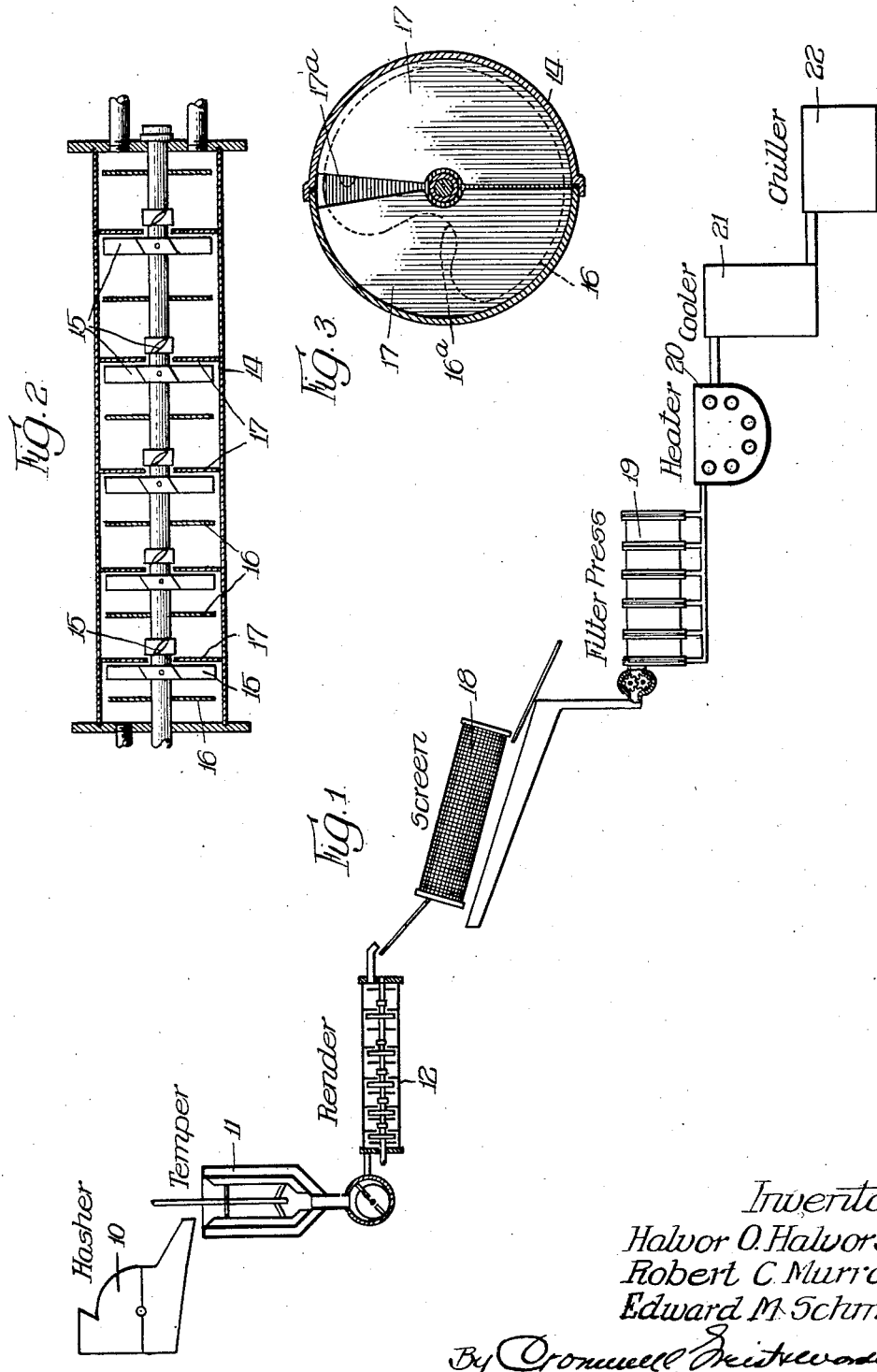

1,930,091

UNITED STATES PATENT OFFICE 1,930,091

PREPARATION OF LARD

Halvor O. Halvorson, Ramsey County, and Robert C. Murray and Edward M. Schmitz, Austin, Minn., assignors to Geo. A. Hormel & Company, Austin, Minn., a corporation of Delaware Application August 1, 1931. Serial No. 554,448

10 Claims. (Cl. 87—13)

This invention relates to the preparation of lard, its general object being the provision of an improved process for the rendering, refining and treatment of fats for the production of an improved culinary commodity.

One of the objects of the invention is the provision of a process for the rapid quantity production of lard of high quality.

Another object is the provision of a process for the production of lard of improved keeping quality.

Another object is the provision of a process for the production of lard of improved shortening value.

Another object is the provision of a process which will produce lard having a high smoke point.

Another object is the provision of a process whereby there may be produced lard which is substantially devoid of color, odor and flavor.

Another object is the provision of a process having the attributes indicated above and which may be practiced economically on a commercial scale for large quantity production.

Other and further objects and advantages of the invention will be pointed out or indicated hereinafter, or will be apparent to one skilled in the art upon an understanding of our process or its employment in practice.

For aid in the following explanation of the invention we describe hereinafter certain examples of procedure and show in the accompanying drawing forming a part of this specification certain schematic arrangements of apparatus whereby the process may be carried on, but it is to be understood that these are presented entirely for the purpose of illustration and that neither the particular kinds of apparatus or the particular examples of procedure hereinafter described, are to be accorded any interpretation calculated to limit the appended claims short of the true and most comprehensive scope of the invention in the art.

In said drawing:

Fig. 1 represents a diagram in the nature of a flow sheet illustrative of one course of procedure whereby the process may be practiced;

Fig. 2 is a diagrammatic illustration of a form of rendering apparatus which may be employed, same being shown in longitudinal sectional elevation; and Fig 3 is another diagrammatic illustration in the nature of a sectional elevation on line 3—3 of Fig. 2.

The term "lard" is customarily applied to the belly fat of swine as well as to a more or less refined preparation of the same commonly used as a culinary commodity, and while that term is employed herein for purpose of convenience, it is to be understood that the present invention is not limited to the treatment of that particular kind of fat.

The most common culinary uses of lard are as a shortening ingredient, as a cooking or heat-transmitting medium, and as a filming and anti-adhesive material. It is generally desirable that it be as nearly as possible devoid of taste, odor and color. It is also generally desirable that its smoke point be as high as possible, as its tendency to smoke may undesirably affect the flavor of the food commodity, as well as constitute a disagreeable incident of the cooking procedure. Keeping quality is also an important factor in the general acceptability and value of lard, as rancidity in it has a deleterious effect on its wholesomeness as well as on its flavor.

The highest grade of lard, usually known as neutral lard because of its absence of flavor, has heretofore been produced by slow rendering in small quantities and at low temperatures. These limitations have made quantity production of neutral lard infeasible, and its cost and selling price consequently relatively high. In the so-called steam rendering and dry rendering processes it has been possible to decrease the cost and increase the rate of production by the use of higher temperatures and the treatment of large batches. The fats rendered by these procedures, however, are likely to have undesirable odor and color characteristics which adversely affect the quality of the product, and hence it is customary to subject them to refining treatment, as with fuller's earth. Such treatments, which aim primarily at the removal of color, odor and flavors, have, on the other hand, undesirable effects on the keeping quality and other characteristics of the product.

By the process constituting the present invention the limitations and undesirable effects of the prior procedures are circumvented and eliminated and the quantity production of lard of the highest quality is rendered possible at costs commensurate with or less than those involved in the production of inferior quality lard by the procedures at present generally employed.

Described generally, the process constituting the present invention contemplates the preparation of the natural fat-containing tissue to a condition rendering it susceptible of being quickly and uniformly heated, then heating the material very rapidly to a temperature which is effective to stop enzymatic action in it, said heating being carried on at a rate such as to afford but little opportunity for enzymatic hydrolysis in the optimum temperature range of such action; and the heating being effected in such fashion as to avoid the scorching or dehydration of any of the nitrogenous content of the material. Fats which are extracted by this heating are then separated from the connective and other cellular tissue in which in the natural condition they are retained, and they are also freed of any residue, such as suspended particles, of such nitrogenous tissue. Then the rendered fats are further heated to a temperature above the boiling point of water, after which they are cooled and allowed to solidify.

The preparation of the fat-containing tissue for the rendering heating may be accomplished by hashing or macerating it to a condition which will give a mass of it fairly uniform or homogenous consistency. The heating of the material for the rendering out of the fats may be accomplished in various ways, but must be conducted in such fashion that it is raised to a temperature above 190° F. very quickly and without any of it being subjected to a scorching heat. This heating should be carried on at such a rate that none of the material is kept at a temperature within the range of 100° F. to 170° F. for more than thirty minutes. While a temperature of about 190° F. is ordinarily adequate to stop enzymatic action in the material, certainty as to that result is attained by heating the material up to almost the boiling point of water, and production is increased and separation of the extracted fat from the other tissue is facilitated by use of such higher temperatures. Definite control must be exercised, however, to preclude any of the nitrogenous tissue becoming heated to the point of dehydration while in contact with the fat.

The invention will be understood in more detail from certain examples of procedure whereby it may be practiced, which will now be described, reference being had to the accompanying drawing. The raw fat-containing tissue is subjected to a hashing or macerating treatment, as in a hasher 10, whereby it is reduced to small pieces as of the order of quarter-inch cubes. It is then heated to a temperature of around 98° F., which may be accomplished by passing it through a temper 11 in the form of a water or steam jacketed vessel having a stirring device therein by operation of which the material is kept in continuous movement for the purposes of expediting its uniform heating and blending or homogenizing it. This heating should be accomplished expeditiously, and should be so controlled that the heat transfer surfaces with which the material contacts are not of such temperature as to admit of scorching the material. By this treatment the material is conditioned for the rendering heating, which is accomplished in a render 12, which may be of the nature of that illustrated in Figs. 2 and 3. The device there shown comprises a cylindrical casing 14 having a rotary shaft extending axially therethrough, which shaft carries propelling paddles 15 adapted to feed the material longitudinally through the casing upon rotation of the shaft. At appropriate intervals on the shaft are mounted the plate-like electrodes 16, which extend radially of the shaft, and at appropriate intervals between these shaft electrodes are mounted the plate-like electrodes 17 secured to the casing. The spacing of the shaft electrodes relative to the casing electrodes is such that alternating current under ordinary commercial line voltage may be passed from one to the other through the intervening mass of prepared fat-containing tissue. The shaft electrodes are connected to one side of the current supply line and the casing electrodes to the other. The electrodes are provided with appropriate apertures or slots 16ª and 17ª through which the material passes in its movement longitudinally of the casing.

The preparation of the fat-containing tissue as above described renders it sufficiently conductive to pass the current between the electrodes and also gives it a homogeneity such that the current can pass with approximately uniform density through all portions of the mass. The movement of the shaft electrodes and of the propelling paddles 15 keeps the material in continuous movement and passes it from one electrode to another until it is finally discharged at the end of the casing. The heating of the material as it is passed through the render is gradual and cumulative, and the heating of that portion of the material between any two adjacent electrodes is approximately uniform throughout its entire mass. Hence the heating to the desired temperature is accomplished very rapidly. Since the heat is generated uniformly throughout the mass between any two adjacent electrodes, and the heating of one part does not depend on heat transfer from another part, the rapid heating may be accomplished without subjecting any of the material to a temperature sufficiently high to scorch or dehydrate any of the nitrogenous substances of the tissue. Consequently, a heating up to a temperature near 212° F. may be accomplished quite rapidly and safely.

This rapid heating to a comparatively high temperature obtains several very highly important results. One of the factors which very deleteriously affects lard, as to keeping quality, smoke point, shortening value and flavor, is the presence in it of free fatty acids. These are products resulting from hydrolysis of some of the fats by enzymatic action. Enzymes are almost invariably present in the natural fatty tissue. They may be of bacterial origin or may be supplied by digestive juices from the stomach, pancreas or upper intestines with which the fatty tissue may have been contacted in the slaughtering or dressing operations. Enzymatic hydrolysis is promoted by heat within certain temperature ranges. It increases particularly with rise of temperature from around body heat up to about 140° F., the activity being particularly pronounced through the upper portion of that range. Upon increase of temperature upwardly from 140° F., the rate of enzymic action decreases but enzymic action is not completely stopped until the temperature reaches the neighborhood of 190° to 200° F. By providing, therefore, for the very rapid heating of the fatty tissue through the dangerous temperature range of enzymic activity, and the carrying on of the temperature up to the stabilizing point, the present process very radically reduces the formation of free fatty acids, and hence contributes to the quality and value of the product in very highly important particulars.

To attain desirable effects of the present process by use of the render above described, the proportioning of the apparatus, as to spacing of the electrodes, rate of feed of the material, and the electrical voltage applied, must be such as to accomplish the heating of the material at a rapid rate. As the temperature of the fatty material increases, its electrical conductivity likewise increases, and hence, in order to permit the utilization of the same voltage across all of the electrodes, the spacing of adjacent electrodes should gradually increase toward the discharge end of the machine. The heating of the material by stages, and the rapid passage of it from each stage to the next higher, contributes to the rapidity of the heating and facilitates control of the temperature, and also permits the rendering to be carried on as a continuous or progressive procedure, new material being supplied as preceding material is being heated and heated material is being discharged.

From the render, the material is discharged to a suitable separating device, such as the screen 18, through which the extracted fat is drained from the cracklings. It is desirable to free this rendered fat of undesirable animal odors and such of the nitrogenous matter of the original tissue as remains in it in the form of small suspended particles. Heretofore it has been the customary practice in lard manufacture to treat the rendered fat with fuller's earth, or other decolorizing agents, for the purpose of removing as much as possible of the color, odor and taste. The use of such clarifying materials, however, is itself found to contribute some taste to the product, and in addition to this undesirable feature, is sometimes found to promote oxidation and rancidity in the product, probably on account of its removing natural anti-oxidants normally present in the natural fat. If allowed to remain in the product, the particles of nitrogenous material may promote oxidation and rancidity, and also lower its smoke point and produce other undesirable effects when it is heated in cooking or otherwise.

In the present process the rendered fat may be freed of the animal odor and of this nitrogenous material without the undesirable effects such as are produced by treatment with fuller's earth or the like. This is accomplished by filtering the rendered fat for the removal of the particles of nitrogenous material, and thereafter heating the filtered fat up to a temperature above the boiling point of water. It is highly important that the nitrogenous material be removed from the fat before it is thus heated, as if it is left in the fat, such heating would scorch or dehydrate it and give the product undesirable taste and color and other disadvantageous or deleterious characteristics.

Accordingly, the fat, upon separation from the cracklings, may be filtered through a suitable filter press, indicated at 19, for removal of the suspended matter, and then passed through a heater 20 in which it is heated up to a temperature of about 220° F., all vapors volatilized from it being immediately drawn off from the presence of the fat. After such heating, the fat is passed through a cooler 21 and thence to a chilling machine 22 in which it is set up ready for packing in merchandising containers.

Certain important particulars of the process are especially to be noted. The first of these is the preparation of the fat-containing tissue to a condition in which it will be susceptible of rapid uniform heating. The second is the rapid heating of the fat-containing tissue up to a temperature which will render out the fat, yet short of a temperature at which any scorching or dehydration of the nitrogenous tissue will result. The more rapid the heating, the less opportunity will there be for enzymatic hydrolysis, and the higher the heating, short of the scorching point, the greater will be the yield and the more certain the stopping of enzymatic action. In the example above described, this rapid heating of the fat may be accomplished under very certain control through regulation of the applied voltage, and due to the fact that the heat is actually generated within the material itself and uniformly throughout it, the possibility of overheating in localized portions is definitely avoided. Thus very rapid rendering of the fat may be accomplished without scorching or dehydration of any of the associated nitrogenous tissue. A third particular of the process which has important bearing on the quality and character of the product is the freeing of the rendered fat from residual nitrogenous matter before heating it to a temperature above 212° F. It is by these two steps that the crude rendered fat is converted to the refined end product. The efficacy of these refining steps, however, is dependent upon characteristics of the preceding rendering treatment. If the rendering treatment were not of such nature as to minimize enzymic hydrolysis and to avoid scorching or dehydration of protein matter in the fat, the subsequent heating would probably be deleterious rather than beneficial, for the reason that at the higher temperature chemical hydrolysis would be promoted, apparently an occount of the presence in the fat of catalytic agents and oxidants resulting from products of such enzymatic action and/or oxidation of the nitrogenous substances occurring in the rendering treatment.

From the foregoing it will be apparent that the process as such may be carried on rapidly and economically and under definite control and a high rate and volume of output obtained. Aside from its economy and rate of output, advantages of the process are reflected in the product, as through its employment there may be produced a lard practically free of color, taste and odor, possessing high shortening power, a high smoke point, and exceptional keeping quality.

What we claim is:

1. A process for preparation of lard, which comprises treating a quantity of fat-containing tissue to render it readily conductive to electrical current, passing through the tissue electric current in quantity effective to generate throughout the same heat effective to render out contained fat but limiting the heating to a degree insufficient to cause scorching of any of the nitrogenous content, separating the rendered fat from the solids, and then heating the fat to a temperature in excess of the boiling point of water.

2. A process as specified in claim 1 and wherein the fat-containing tissue is macerated and heated to a temperature approximating body heat preparatory to the passing of the electric current through it.

3. A process for preparation of lard which comprises macerating a quantity of fat-containing tissue and heating it quickly to a temperature effective to increase its conductivity to electrical current, passing through a mass of the fat-containing tissue electrical current in quantity effective to generate quickly throughout the same heat of a temperature effective to render out contained fat but limiting the heating to a degree ineffective to cause scorching of any of the nitrogenous content, filtering the rendered fat to remove the solids, and heating the filtered fat to a temperature in excess of the boiling point of water.

4. A process for preparation of lard which comprises treating a quantity of fat-containing tissue to render it readily conductive to electrical current, passing through the tissue electrical current in quantity effective to generate throughout the same heat effective to render out contained fat but limiting the heating to a degree insufficient to cause scorching of any of the nitrogenous content, and separating the rendered fat from the solids.

5. A process as specified in claim 4 and wherein the fat-containing tissue is macerated and heated to a temperature approximating body heat, whereby it is rendered readily conductive to electrical current.

6. A process for preparation of lard which comprises macerating a mass of fat-containing tissues and heating it sufficiently to render it readily conductive to electrical current, passing through the mass of fat-containing tissue electrical current in quantity effective to generate quickly throughout the same heat of a temperature effective to render out contained fat but limiting the heating to a degree ineffective to cause scorching of any of the nitrogenous content, stirring the fat during said heating, and filtering the rendered fat.

7. A process as specified in claim 4 and wherein the application of electrical current is such as to generate in the fat-containing tissue a temperature in excess of 170° F.

8. A process as specified in claim 6 and which includes the regulation of the application of electrical current to such quantity as is effective to raise the mass to a temperature effective to nugify enzymatic hydrolysis of glycerides.

9. A process as specified in claim 1 and wherein the application of electrical current is such as to accomplish the heating of the fat to a temperature in excess of 170° F. but not exceeding 212° F.

10. A process of rendering fat from fat-containing material which comprises treating the material to increase its conductivity to electrical current, feeding the material progressively in a continuous stream, and passing through the material in the stream in the course of its travel electric current in density sufficient to generate in the material subjected thereto a rendering heat effective to render fat from the material.

HALVOR O. HALVORSON.
ROBERT C. MURRAY.
EDWARD M. SCHMITZ.